(12) United States Patent
Corsmeier et al.

(10) Patent No.: US 7,837,436 B2
(45) Date of Patent: *Nov. 23, 2010

(54) METHOD AND APPARATUS FOR REGULATING FLUID FLOW THROUGH A TURBINE ENGINE

(75) Inventors: Donald Michael Corsmeier, West Chester, OH (US); David Andrew Perveiler, West Chester, OH (US); George Joseph Johnson, Morrow, OH (US)

(73) Assignee: General Electric Company, Schenectady, NY (US)

( * ) Notice: Subject to any disclaimer, the term of this patent is extended or adjusted under 35 U.S.C. 154(b) by 801 days.

This patent is subject to a terminal disclaimer.

(21) Appl. No.: 11/753,929

(22) Filed: May 25, 2007

(65) Prior Publication Data
US 2009/0016874 A1    Jan. 15, 2009

(51) Int. Cl.
*F01D 17/00* (2006.01)
(52) U.S. Cl. .................. 415/145; 415/1; 415/211.2; 60/226.3; 60/262
(58) Field of Classification Search .................. 415/1, 415/145, 211.2; 60/226.1, 226.3, 262
See application file for complete search history.

(56) References Cited
U.S. PATENT DOCUMENTS

| 4,285,194 | A | 8/1981 | Nash |
| 4,409,788 | A | 10/1983 | Nash et al. |
| 4,416,111 | A | 11/1983 | Lenahan et al. |
| 5,048,286 | A | 9/1991 | Stransky et al. |
| 5,054,286 | A | 10/1991 | Stransky et al. |
| 5,113,649 | A | 5/1992 | Siedlecki, Jr. |
| 5,136,840 | A | 8/1992 | Nash |
| 5,182,905 | A | 2/1993 | Stransky et al. |
| 5,184,461 | A | 2/1993 | Stransky et al. |
| 5,211,007 | A | 5/1993 | Marvin |
| 5,287,697 | A | 2/1994 | Johnson et al. |
| 5,305,599 | A | 4/1994 | Marvin |
| 5,307,624 | A | 5/1994 | Even-Nur et al. |
| 5,343,697 | A | 9/1994 | Johnson et al. |
| 5,417,056 | A | 5/1995 | Johnson et al. |
| 5,694,768 | A | 12/1997 | Johnson et al. |
| 7,140,174 | B2 | 11/2006 | Johnson |

*Primary Examiner*—Ninh H Nguyen
(74) *Attorney, Agent, or Firm*—William Scott Andes, Esq.; Armstrong Teasdale LLP

(57) ABSTRACT

A method for regulating fluid flow through a gas turbine engine is provided. The method includes coupling an outer fairing to a radially outer duct wall and coupling an inner fairing to a radially inner duct wall. An annular valve is coupled between the radially outer and the radially inner duct walls such that an outer bypass flow area is at least partially defined between the annular valve and the outer fairing, and such that an inner bypass flow area is at least partially defined between the annular valve and the inner fairing. The annular valve is selectively positioned between a first operational position and a second operational position, such that at least one of the outer bypass and the inner bypass flow areas is varied during a transition from a first turbine operation to a second turbine operation.

20 Claims, 4 Drawing Sheets

METHOD AND APPARATUS FOR REGULATING FLUID FLOW THROUGH A TURBINE ENGINE

STATEMENT REGARDING FEDERALLY SPONSORED RESEARCH & DEVELOPMENT

The U.S. Government may have certain rights in this invention as provided for by the terms of Contract No. N00019-96-C-0176.

BACKGROUND OF THE INVENTION

This invention relates generally to gas turbine engines and, more particularly, to methods and apparatus for regulating fluid flows within a gas turbine engine.

At least some known aircraft gas turbine engines include a fan, a compressor, a combustor, a high pressure turbine, a low pressure turbine, and an augmentor or "afterburner". Airflow entering the fan is compressed. Airflow exiting the fan is split such that a portion of the flow is directed into the compressor and the remaining portion of the flow, referred to as fan bypass flow, is directed into a bypass passage where it bypasses the compressor, the combustor, the high pressure turbine, and the low pressure turbine. Airflow entering the compressor is compressed and directed to the combustor where it is mixed with fuel and ignited, producing hot combustion gases used to drive both the high pressure and the low pressure turbines. Moreover, at least some known gas turbine engines combine a portion of the fan bypass flow with the airflow exiting the low pressure turbine.

To regulate an amount of bypass air supplied to the augmentor, at least some gas turbine engines include a valve assembly. More specifically, in some known gas turbine engines, the flow of the fan bypass air is regulated based on specific exhaust liner pressure ratio requirements demanded for the type of flight mode of the aircraft.

However, at least some known valve assemblies include a plurality of blocker doors that are adjusted independently to maintain exhaust liner pressure ratio requirements. As such, each blocker door includes a separate kinematics system, which may each include, for example, a plurality of crank-arm shafts and actuators. Accordingly, such valve assemblies are generally relatively complex designs and add additional cost and additional weight to the aircraft.

Furthermore, in at least some known valve assemblies, an aerodynamic throat, with a significantly smaller area than the physical throat, could undesirably form downstream from the physical throat in the outer bypass duct. Such an aerodynamic throat may have unsteady behavior that is difficult to predict and to control. In addition, a valve assembly is a pressure loss device, and, if a downstream aerodynamic throat occurs, there may exist more than one valve position that has the same pressure loss. Some known control systems have difficulty accounting for multiple solutions, such as multiple valve position having the same pressure loss. Unexpected multiple solutions may lead to a control systems failure.

BRIEF DESCRIPTION OF THE INVENTION

In one aspect a method for regulating fluid flow through a gas turbine engine is provided. The method includes coupling an outer fairing to a radially outer duct wall and coupling an inner fairing to a radially inner duct wall. An annular valve is coupled between the radially outer and the radially inner duct walls such that an outer bypass flow area is at least partially defined between the annular valve and the outer fairing, and such that an inner bypass flow area is at least partially defined between the annular valve and the inner fairing. The annular valve is selectively positioned between a first operational position and a second operational position, such that at least one of the outer bypass and the inner bypass flow areas is varied during a transition from a first turbine operation to a second turbine operation.

In another aspect a valve assembly for a gas turbine engine is provided. The valve assembly includes an outer fairing coupled to a radially outer duct wall and an inner fairing coupled to a radially inner duct wall. The valve assembly further includes an annular valve slidably coupled between the radially outer and the radially inner duct walls such that an outer flow area is at least partially defined between the annular valve and the outer fairing, and such that an inner flow area is at least partially defined between the annular valve and the inner fairing. The annular valve is selectively positionable between a first operational position and a second operational position to vary a flow through at least one of the outer and the inner flow areas.

In a still further aspect a gas turbine engine is provided. The gas turbine engine includes a fan assembly and a fan bypass duct coupled to the fan assembly. An augmentor valve assembly is coupled downstream from the fan assembly within the fan bypass duct. The augmentor valve assembly includes an outer fairing coupled to a radially outer fan bypass duct wall, an inner fairing coupled to a radially inner fan bypass duct wall, and an annular valve slidably coupled between the radially outer and the radially inner fan bypass duct walls. The annular valve is selectively positionable between a first operational position and a second operational position to vary a flow through at least one of an outer bypass flow area and an inner bypass flow area.

DETAILED DESCRIPTION OF THE INVENTION

Figure 1:
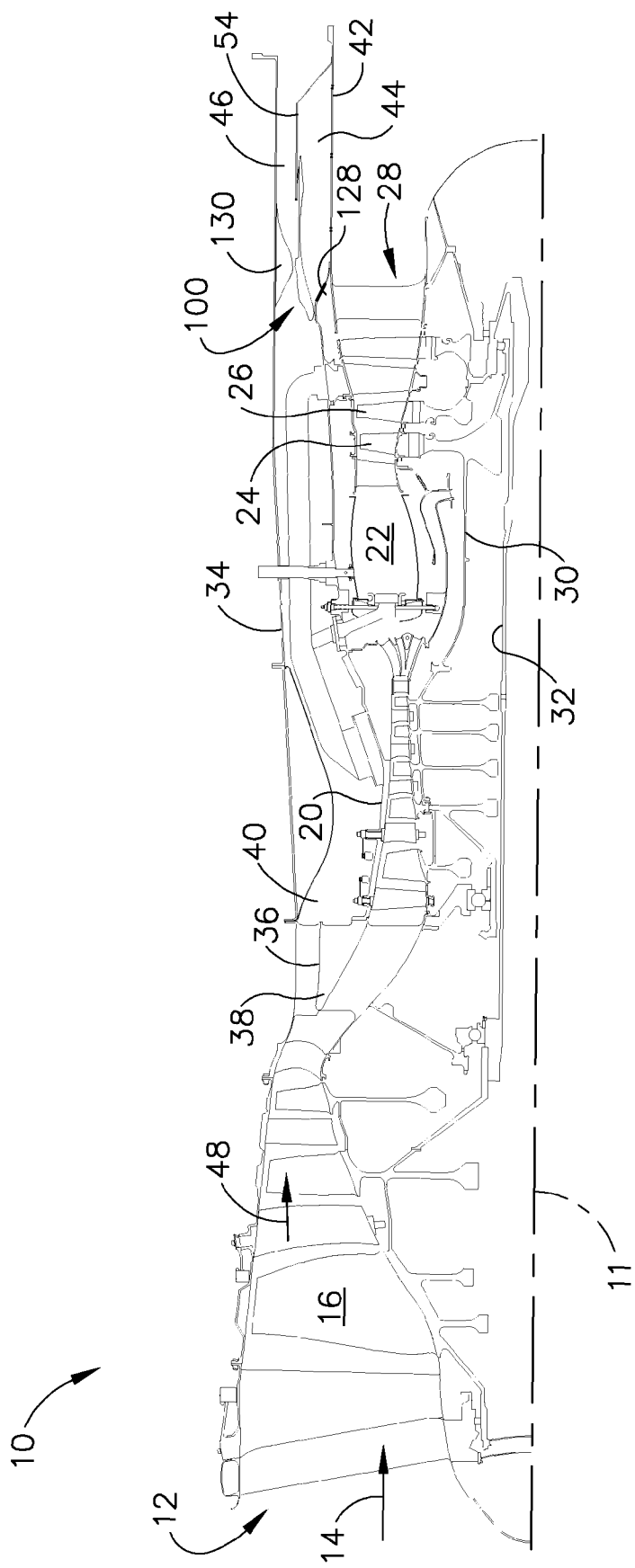
FIG. 1 is a schematic illustration of an exemplary variable cycle gas turbine engine.
Figure 2:
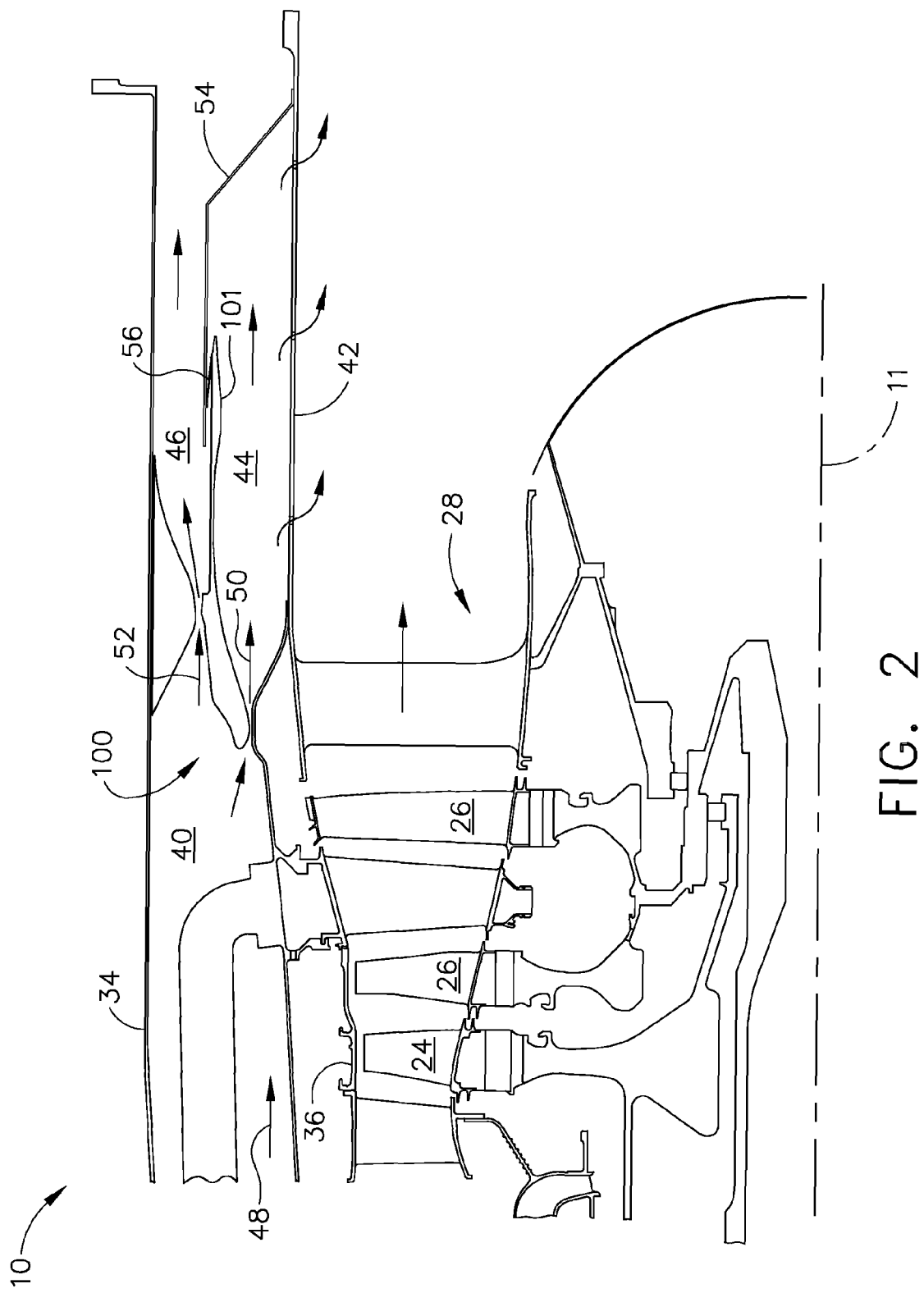
FIG. 2 is an enlarged schematic illustration of a portion of the variable cycle gas turbine engine shown in FIG. 1.

FIG. 1 is a schematic illustration of an exemplary variable cycle gas turbine engine 10 having a longitudinal centerline 11. FIG. 2 is an enlarged view of gas turbine engine 10. Gas turbine engine 10 includes an annular inlet 12 for receiving ambient air 14 followed in axial flow relationship by a fan assembly 16, a high pressure compressor (HPC) 20, a combustor 22, a high pressure turbine (HPT) 24, a low pressure turbine (LPT) 26 and an augmentor 28. HPT 24 powers HPC 20 through a first shaft 30. LPT 26 powers fan assembly 16 by a second shaft 32. Engine 10 further includes an outer casing 34 which is spaced from an inner casing 36 including a forward section 38 of inner casing 36 defining a bypass duct 40. In the exemplary embodiment, augmentor 28 includes a diffuser liner 42.

In the exemplary embodiment, gas turbine engine 10 also includes a valve assembly 100 that is coupled within bypass duct 40. More specifically, valve assembly 100 is positioned to facilitate separating bypass duct 40 into a radially inner bypass duct 44 and a radially outer bypass duct 46. More specifically, in the exemplary embodiment, inner bypass duct 44 and outer bypass duct 46 are aligned substantially concentrically. Accordingly, and in the exemplary embodiment, fan bypass flow 48 entering bypass duct 40 is divided into an inner bypass flow 50 and an outer bypass flow 52. Moreover, in the exemplary embodiment, valve assembly 100 facilitates regulating the volume of inner bypass flow 50 that is channeled through inner bypass duct 44 and the volume of outer bypass flow 52 that is channeled through outer bypass duct 46.

In the exemplary embodiment, a separation liner 54 contacts a tail portion 101 of valve assembly 100 and is coupled to diffuser liner 42 to facilitate channeling inner bypass flow 50 through inner bypass duct 44. Furthermore, separation liner 54 also facilitates channeling outer bypass flow 52 through outer bypass duct 46. A seal 56 extends between valve tail 101 and separation liner 54 to facilitate reducing leakage of outer bypass flow 52 into inner bypass duct 44. More specifically, in the exemplary embodiment, seal 56 is, for example, but is not limited to being, a thin sheet metal, or "turkey feather" type, seal.

Figure 3:
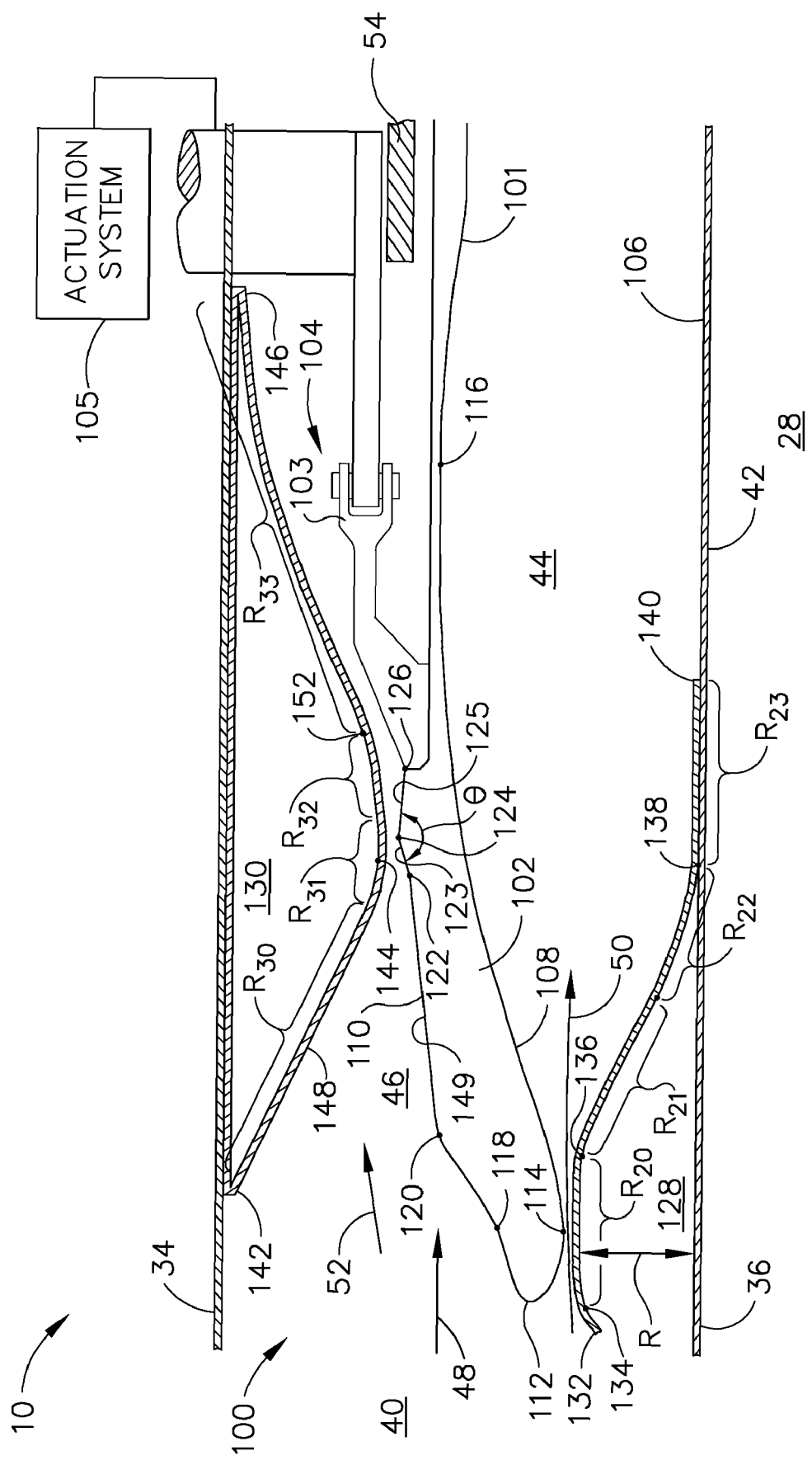
FIG. 3 is a schematic illustration of an exemplary valve assembly in a first operational location that may be used with the variable cycle gas turbine engine shown in FIG. 1.
Figure 4:
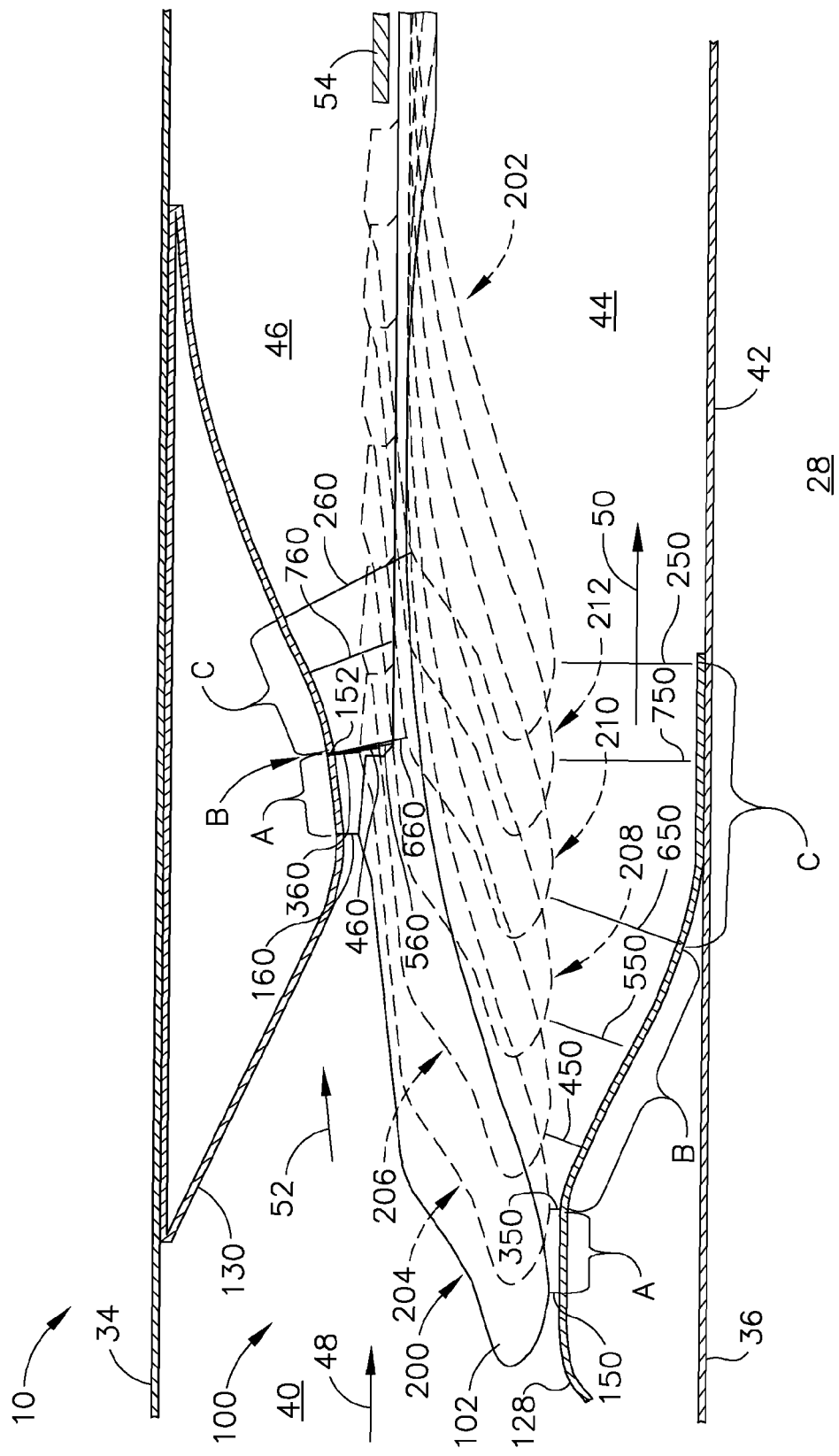
FIG. 4 is a schematic illustration of the valve assembly shown in FIG. 3 and illustrates a plurality of operational locations in hidden.

FIG. 3 is a schematic illustration of valve assembly 100 at a first operational location 200 (shown in FIG. 4) that may be used with gas turbine engine 10. FIG. 4 is a schematic illustration of valve assembly 100 in a plurality of operational locations, described in more detail below. Although valve assembly 100 is shown coupled to engine 10 in the exemplary embodiment, it should be realized that valve assembly 100 may also be coupled to a wide variety of other gas turbines without limiting the scope of the invention described herein.

In the exemplary embodiment, valve assembly 100 includes an annular slide valve 102 that is slidably coupled within bypass duct 40 via a crank 104 extending at least partially through outer casing 34. Crank 104 is coupled to a connection portion that is coupled to valve 102. For example, in the exemplary embodiment, the connection portion coupled to valve 102 is, but is not limited to being, a yoke 103 coupled to valve 102. Alternatively, crank 104 may be coupled to valve 102 using any other suitable mechanism that enables valve assembly 100 to function as described herein. In the exemplary embodiment, yoke 103 may be coupled to annular slide valve 102 using a brazing or a welding procedure, for example. In an alternative embodiment, yoke 103 may be coupled to annular slide valve 102 with at least one mechanical fastener (not shown).

Further, in the exemplary embodiment, crank 104 is coupled to an actuation system 105 for controlling crank 104 and, more specifically, slide valve 102. As such, actuation system 105 facilitates controlling the volume of flows 50 and 52 entering both inner and outer bypass ducts 44 and 46, as described herein. In one embodiment, actuation system 105 includes a kinematics system (not shown) and crank 104. Actuation system 105 may be, for example, but is not limited to being, a computer system and/or any other system that enables crank 104 and/or slide valve 102 to function as described herein.

In one embodiment, crank 104 is a crank assembly that includes, but is not limited to including, a plurality of bell cranks that are spaced circumferentially about slide valve 102 and that have a common kinematics system (not shown) coupled to a common actuation system (not shown). Alternatively, crank 104 may include any other crank assembly and/or kinematics system that enables valve assembly 100 to function as described herein. Crank 104 enables slide valve 102 to move substantially parallel to longitudinal centerline 11 between first operational location 200 and a second operational location 202.

As used herein, with respect to valve 102, inner fairing 128, and outer fairing 130, the term "converge," or forms of the word, refers to a narrowing of a cross-sectional area with respect to displacement along an afterward direction, and the term "diverge," or forms of the word, refers to a widening of a cross-sectional area with respect to displacement along an afterward direction.

In the exemplary embodiment, slide valve 102 is positioned radially outward from, and extends circumferentially about, a radially outer surface 106 of diffuser liner 42. More specifically, in the exemplary embodiment, slide valve 102 is annular and substantially circumscribes inner casing 36 and/or diffuser liner 42. Slide valve 102 includes a radially inner surface 108 and a radially outer surface 110. In the exemplary embodiment, inner surface 108 converges gradually from a valve end or nose 112 to an apex 114, and converges gradually from apex 114 to a point 116 upstream from tail 101. Further, in the exemplary embodiment, outer surface 110 converges gradually from valve nose 112 to a first outer apex 118, and diverges outwardly from apex 118 to a blend point 120. Outer surface 110 further converges gradually from blend point 120 to a second outer apex 122, diverges outwardly from apex 122 to a choke point 124, and converges from choke point 124 to a downstream point 126.

In the exemplary embodiment, nose 112 facilitates splitting fan bypass flow 48 into inner and outer bypass flows 50 and 52 while reducing separation within flow 48. Furthermore, in the exemplary embodiment, a surface 123 immediately upstream from choke point 124 and a surface 125 immediately downstream from choke point 124 are connected together at choke point 124 at an angle θ. More specifically, in the exemplary embodiment, angle θ is selected to facilitate providing a sufficient convergence at point 124 for outer bypass flow 52.

In the exemplary embodiment, valve assembly 100 includes an inner fairing 128 and an outer fairing 130. Annular slide valve 102 extends between inner fairing 128 and outer fairing 130. In the exemplary embodiment, inner fairing 128 is upstream from outer fairing 130. More specifically, in the exemplary embodiment, inner fairing 128 is coupled to inner casing 36 and/or diffuser liner 42, and outer fairing 130 is coupled to outer casing 34. In the exemplary embodiment, inner fairing 128 and outer fairing 130 are coupled to respective casings 36 and 34 using a brazing or a welding procedure, for example. In an alternative embodiment, fairings 128 and 130 are coupled to respective casings 36 and 34 using at least one mechanical fastener (not shown). In another alternative embodiment, inner fairing 128 is coupled to inner casing 36 and/or diffuser lined 42 using at least one seal (not shown). Moreover, inner fairing 128 is maintained at a substantially constant radial position using a strut, or any other suitable mechanism, that is coupled between inner fairing 128, and outer fairing 130 and/or outer casing 34. As such, in such an alternative embodiment, a location of inner fairing 128 is facilitated to remain substantially constant with respect to a location of outer fairing 130 when, for example, inner casing 36 and/or diffuser liner 42 thermally expand differently than outer casing 34.

In the exemplary embodiment, inner fairing 128 and annular slide valve 102 at least partially define inner bypass duct 44, and outer fairing 130 and annular slide valve 102 at least partially define outer bypass duct 46. Furthermore, in the exemplary embodiment, inner fairing 128 and outer fairing 130 are each contoured such that ducts 44 and 46 each have varying cross-sectional areas as slide valve 102 is axially displaced therethrough. More specifically, in the exemplary embodiment, inner fairing 128 is divergent from an upstream end 132 to a first apex 134 and has a substantially constant radius R and cross-sectional area from first apex 134 to a second apex 136. Inner fairing 128 further converges gradually from second apex 136 to a coupling point 138, and has a substantially constant cross-sectional area from coupling point 138 to a downstream end 140. Similarly, outer fairing 130 diverges gradually from an upstream end 142 to an apex 144, and converges gradually from apex 144 to a downstream end 146.

In the exemplary embodiment, inner fairing 128 includes a defined first substantially cylindrical region $R_{20}$, a conical region $R_{21}$, a blend region $R_{22}$, and a second substantially cylindrical region $R_{23}$. In the exemplary embodiment, cylindrical region $R_{20}$ is sized to enable bypass flow 50 to flow through a pre-defined area between inner fairing 128 and slide valve 102, when slide valve 102 is in a forward position, such as first operational location 200. The slope of conical region $R_{21}$ causes a cross-sectional area of inner bypass duct 44 to vary when slide valve 102 is displaced axially within that portion of duct 40 that is substantially aligned with region $R_{21}$, as described herein. Furthermore, in the exemplary embodiment, conical region $R_{21}$ facilitates reducing separation within inner bypass flow 50. Cylindrical region $R_{22}$ facilitates maintaining a substantially constant cross-sectional area of inner bypass duct 44 as valve 102 is displaced afterward.

In the exemplary embodiment, outer fairing 130 includes a defined first conical region $R_{30}$, a blend region $R_{31}$, a second conical region $R_{32}$, and a third conical region $R_{33}$. Regions $R_{30}$ and $R_{31}$ facilitate improving the aerodynamic performance of valve assembly 100, for example. Regions $R_{30}$ and $R_{31}$ facilitate smoothly transitioning flow 52 to a minimum cross-sectional area of outer bypass duct 46 such that a separation within flow 52 is facilitated to be reduced. As such, valve assembly 100 facilitates increasing the controllability of flow 52. Furthermore, region $R_{30}$ is radially spaced from inner fairing 128 such that fan bypass flow 48 remains at a substantially constant velocity within that portion of bypass duct 40 that is substantially aligned with region $R_{30}$. In the exemplary embodiment, blend region $R_{31}$ facilitates reducing separation within outer bypass flow 52 therein.

In the exemplary embodiment, the contour and/or slope of conical region $R_{32}$ causes a cross-sectional area of outer bypass duct 46 to vary as slide valve 102 is moved therethrough. Furthermore, region $R_{32}$ causes an outer fairing surface 148 and a slide valve outer surface 149 to converge to facilitate choking outer bypass flow 52 at choke point 124. Moreover, in the exemplary embodiment, the conical region $R_{33}$ facilitates reducing separation within outer bypass flow 52 such that the possibility of an occurrence of an aerodynamic throat that is substantially smaller than a cross-sectional area of outer bypass duct 46 is reduced. As such, valve assembly 100 facilitates increasing the control of outer bypass flow 52.

During operation of engine 10, valve assembly 100 is selectively positioned within bypass duct 40 to facilitate regulating the volume of inner bypass flow 50 channeled through inner bypass duct 44 and the volume of outer bypass flow 52 channeled through outer bypass duct 46. More specifically, slide valve 102 is moved via crank 104 between first operational location 200 and second operational location 202, as described herein. Crank 104 may be controlled using actuation system 105 and/or a kinematics system (not shown). In the exemplary embodiment, actuation system 105 controls a kinematics system that is coupled to a plurality of circumferentially-spaced cranks 104.

In the exemplary embodiment, slide valve 102 may be moved to any location between first operational location 200 and second operational location 202, although for clarity purposes, only seven operational locations have been described. Further, for exemplary purposes, operational locations are grouped into three mode groups, as described below, but it should be understood, that the operational locations may be grouped into more or less than three mode groups.

In the exemplary embodiment, first operational location 200 is selected for a first turbine operation, such as, for example, the jet-born mode of an aircraft (not shown), and second operational location 202 is selected for a second turbine operation, such as, for example, a wing-born mode of the aircraft. As such, in the exemplary embodiment, movement of slide valve 102 facilitates transitioning operations between the jet-born mode and the wing-born mode of the aircraft. More specifically, in the exemplary embodiment, slide valve 102 is transitioned from first operational location 200 to second operational location 202 through a third operational location 204, a fourth operational location 206, a fifth operational location 208, a sixth operational location 210, and a seventh operational location 212, each of which is described in more detail below. In the exemplary embodiment, each operational location has a corresponding inner bypass duct cross-sectional area, and a corresponding outer bypass duct cross-sectional area, as described herein.

Furthermore, in the exemplary embodiment, a first location group A includes first and third locations 200 and 204, a second location group B includes third, fourth, fifth, and sixth locations 204, 206, 208, and 210, and a third location group C includes sixth, seventh, and second locations 210, 212, and 202. More specifically, in the exemplary embodiment, first location group A corresponds to valve 102 locations during the first turbine operation, second location group B corresponds to valve 102 locations during a transition from the first turbine operation to the second turbine operation, and third location group C corresponds to valve 102 locations during the second turbine operation. In the exemplary embodiment, the first turbine operation is the jet-born mode of an aircraft (not shown). During the jet-born mode, fan bypass flow 48 is channeled through at least one lift post nozzle (not shown) to facilitate vertically lifting the aircraft. In the exemplary embodiment, the second turbine operation is the wing-born mode of an aircraft (not shown). During the wing-born mode, inner bypass flow 50 is channeled through diffuser liner 42 into augmentor to join a core flow (not shown), and outer bypass flow 52 is channeled through at least one aft exhaust nozzle (not shown) such that inner and outer bypass flows 50 and 52 facilitate propelling the aircraft in a forward direction.

In the exemplary embodiment, when slide valve 102 is positioned within first location group A, a large portion of the fan bypass flow 48 is prevented from entering inner and outer bypass ducts 44 and 46. As such, fan bypass flow 48 may be channeled to other outlets (not shown), such as, for example, lift post nozzles (not shown) that facilitate vertical lift of the aircraft. The remaining fan bypass flow 48 is channeled into inner bypass duct 44 as inner bypass flow 50 and into outer bypass duct 46 as outer bypass flow 52. Inner bypass flow 50 is channeled into augmentor 28 through diffuser liner 42.

In the exemplary embodiment, at first operational location 200, slide valve 102 is positioned at its most axially forward location. Furthermore, in the exemplary embodiment, when slide valve 102 is first operational location 200, a first inner bypass duct cross-sectional area 150 and a first outer bypass duct cross-sectional area 160 are minimum areas of inner and outer bypass ducts 44 and 46, respectively. Furthermore, in the exemplary embodiment, third operational location 204 is where first location group A becomes second location group B. In the exemplary embodiment, at third location 204, a third inner bypass duct cross-sectional area 350 is about equal to first inner bypass duct cross-sectional area 150, and a third outer bypass duct cross-sectional area 360 is larger than first outer bypass duct cross-sectional area 160, for example, but not limited to, third outer bypass duct cross-sectional area 360 being about 50% larger than first outer bypass duct cross-sectional area 160.

In the exemplary embodiment, when slide valve 102 is located within second location group B, third, fourth, fifth, and sixth inner bypass duct cross-sectional areas 350, 450, 550, and 650, respectively, are varied such that a generally short axial displacement of valve 102 causes a generally large change in the cross-sectional area of inner bypass duct 44. In the exemplary embodiment, third, fourth, fifth, and sixth outer bypass duct cross-sectional areas 360, 460, 560, and 660, respectively, are each varied at generally regular and gradual intervals with respect to valve 102 axial displacement. More specifically, in the exemplary embodiment, sixth inner bypass duct cross-sectional area 650 is approximately ten times larger than third inner bypass duct cross-sectional area 350.

Furthermore, in the exemplary embodiment, the contour of valve 102 between blend point 120 and apex 122 and the contour of outer fairing 130 near a point 152 facilitate the generally gradual change of outer bypass duct cross-sectional areas 360, 460, 560, and 660 as valve 102 is displaced at generally regular intervals. In the exemplary embodiment, point 152 is at a location where outer fairing region $R_{32}$ transitions to outer fairing region $R_{33}$. In the exemplary embodiment, when valve 102 is at sixth operational location 210, blend point 120 is substantially aligned with point 152. Additionally, during engine operations, as the aircraft transitions from the first operation to the second operation, slide valve 102 transitions through locations within location group B, such that inner and outer bypass flows 50 and 52, respectively, may be unchoked.

In the exemplary embodiment, when slide valve 102 is located within third location group C, as slide valve 102 is displaced axially, sixth, seventh, and second inner bypass duct cross-sectional areas 650, 750, and 250, respectively, each remain substantially equal to each other while sixth, seventh, and second outer bypass duct cross-sectional areas 660, 760, and 260, respectively, are each varied with respect to each other. More specifically, in the exemplary embodiment, seventh outer bypass duct cross-sectional area 760 is about a third larger than sixth outer bypass duct cross-sectional area 660, and second outer bypass duct cross-sectional area 260 is about a third larger than seventh outer bypass duct cross-sectional area 760.

In the exemplary, when slide valve 102 is at second operational location 202, second inner bypass duct cross-sectional area 250 and second outer bypass duct cross-sectional area 260 are maximum cross-sectional areas of inner outer bypass ducts 44 and 46, respectively. Furthermore, when slide valve 102 is located within location group C, the outer bypass duct cross-sectional area is defined between blend point 120 and a portion of outer fairing 130 within region $R_{33}$. More specifically, in the exemplary embodiment, when slide valve 102 is located within location group C, at least a portion of outer bypass flow 52 is channeled through the aft exhaust nozzle of the aircraft to facilitate propelling the aircraft in a forward direction, and at least a portion of inner bypass flow 50 is channeled through diffuser liner 42 to join the core fluid flow.

The above-described methods and apparatus enable the regulation of a duct cross-sectional area, and, therefore, the control of a volume of fluid flowing through the duct. More specifically, a contoured annular slide valve, in combination with a contoured outer fairing and a contoured inner fairing, causes the cross-sectional areas of an inner bypass duct and an outer bypass duct to vary when the annular valve is axially displaced. The contours of the annular slide valve, inner fairing, and/or outer fairing facilitate enabling the transition from the first operation to the second operation, while facilitating maintaining optimal flow conditions, such as, but not limited to, choking, velocity, pressure, and/or separation, and maintaining pressure ratio requirements. More specifically, the valve assembly facilitates reducing separation within an inner and/or outer bypass flow such that an aerodynamic throat with a significantly smaller area than the physical throat is prevented from forming downstream from the physical throat during the transition and/or wing-born modes. As such, the valve assembly facilitates preventing an aerodynamic throat having unsteady behavior.

Furthermore, because one annular valve is movable within the bypass duct, the complexity of a valve assembly actuation system is facilitated to be reduced. For example, a single crank assembly may be coupled to the annular valve and a single kinematics system may be coupled to the crank assembly to control both the outer bypass duct area and the inner bypass duct area. As such, the number of actuation components is facilitated to be reduced causing the complexity of actuating the valve assembly to be reduced.

In addition, the transition from a first turbine operation to a second turbine operation is facilitated to be simplified by the valve assembly describe herein as opposed to using a plurality of independently movable valve assembly components. A turbine operator may only be required to activate the single annular valve and/or kinematics system to transition the operation of the turbine, such as, for example, transitioning from a jet-born mode of an aircraft to a wing-born mode of the aircraft, by displacing the annular slide valve axially afterwards using a crank assembly. As such, the safety of transitioning turbine operations is facilitated to be increased because control of the bypass flow and/or activation system is facilitated to be simplified. Moreover, the valve assembly described herein facilitates reducing the cost and the weight of the flow regulation system because the valve assembly is simplified in comparison to regulation systems that include a plurality of independently movable components.

Exemplary embodiments of a method and apparatus for regulating a fluid flow through a gas turbine engine are described above in detail. The apparatus is not limited to the specific embodiments described herein, but rather, components of the method and apparatus may be utilized independently and separately from other components described herein. For example, the annular valve assembly may also be used in combination with other turbine engine components having a fluid flow therethrough, and is not limited to practice with only a gas turbine engine bypass flow, as described herein. Rather, the present invention can be implemented and utilized in connection with many other fluid flow regulation applications.

While the invention has been described in terms of various specific embodiments, those skilled in the art will recognize that the invention can be practiced with modification within the spirit and scope of the claims.

What is claimed is:

1. A method for regulating fluid flow through a gas turbine engine, said method comprises:
   coupling an outer fairing to a radially outer duct wall;
   coupling an inner fairing to a radially inner duct wall;
   coupling an annular valve between the radially outer and radially inner duct walls such that an outer bypass flow area is at least partially defined between the annular valve and the outer fairing, and such that an inner bypass flow area is at least partially defined between the annular valve and the inner fairing; and
   selectively positioning the annular valve between a first operational position and a second operational position, such that at least one of the outer bypass and the inner bypass flow areas is varied during a transition from a first turbine operation to a second turbine operation.

2. A method in accordance with claim 1 further comprising coupling an actuator to the annular valve to control movement of the valve relative to the outer and inner fairings.

3. A method in accordance with claim 1 further comprising:
   coupling an actuation system including at least one crank to the annular valve; and
   selectively positioning the annular valve using the at least one crank.

4. A method in accordance with claim 1 wherein selectively positioning the annular valve between a first operational position and a second operational position further comprises selectively positioning the annular valve to facilitate discharging fluid flow from the engine in a direction that is substantially perpendicular to a centerline of the turbine engine.

5. A method in accordance with claim 1 wherein selectively positioning the annular valve between a first operational position and a second operational position further comprises selectively positioning the annular valve to facilitate discharging fluid flow from the turbine engine in a direction that is substantially parallel to a centerline of the turbine engine.

6. A method in accordance with claim 1 wherein selectively positioning the annular valve between a first operational position and a second operational position further comprises selectively positioning the annular valve at a predetermined location wherein the flow areas of the outer bypass and the inner bypass are facilitated to be minimized.

7. A method in accordance with claim 1 wherein selectively positioning the annular valve between a first operational position and a second operational position further comprises selectively positioning the annular valve at a predetermined location wherein the flow areas of the outer bypass and the inner bypass are facilitated to be maximized.

8. A valve assembly for a gas turbine engine, said valve assembly comprising:
   an outer fairing coupled to a radially outer duct wall;
   an inner fairing coupled to a radially inner duct wall; and
   an annular valve slidably coupled between said radially outer and said radially inner duct walls such that an outer flow area is at least partially defined between said annular valve and said outer fairing, and such that an inner flow area is at least partially defined between said annular valve and said inner fairing, said annular valve is selectively positionable between a first operational position and a second operational position to vary a flow through at least one of said outer and said inner flow areas.

9. A valve assembly in accordance with claim 8 further comprising a crank assembly coupled to said annular valve to facilitate displacing said annular valve relative to said outer and said inner fairings.

10. A valve assembly in accordance with claim 9 further comprising an actuator coupled to said crank assembly to facilitate positioning said annular valve relative to said outer and said inner fairings.

11. A valve assembly in accordance with claim 8 wherein said annular valve is selectively positionable to facilitate discharging a fluid flow from the turbine engine in a direction that is substantially perpendicular to a centerline of the turbine.

12. A valve assembly in accordance with claim 8 wherein said annular valve is selectively positionable to facilitate discharging a fluid flow from the turbine engine in a direction that is substantially parallel to a centerline of the turbine.

13. A valve assembly in accordance with claim 8 wherein said inner fairing comprises contours that facilitate varying said inner flow area, and said outer fairing comprises contours that facilitate varying said outer flow area.

14. A gas turbine engine comprising:
   a fan assembly;
   a fan bypass duct coupled to the fan assembly; and
   an augmentor valve assembly coupled downstream from the fan assembly within said fan bypass duct, said augmentor valve assembly comprising:
      an outer fairing coupled to a radially outer fan bypass duct wall;
      an inner fairing coupled to a radially inner fan bypass duct wall; and
      an annular valve slidably coupled between said radially outer and said radially inner fan bypass duct walls, said annular valve is selectively positionable between a first operational position and a second operational position to vary a flow through at least one of an outer bypass flow area and an inner bypass flow area.

15. A gas turbine engine in accordance with claim 14 wherein said outer bypass flow area is at least partially defined between said annular valve and said outer fairing, and said inner bypass flow area is at least partially defined between said annular valve and said inner fairing.

16. A gas turbine engine in accordance with claim 15 wherein said annular valve is selectively positionable to facilitate discharging a fluid flow from the gas turbine engine in a direction that is substantially perpendicular to a centerline of the turbine engine.

17. A gas turbine engine in accordance with claim 15 said annular valve is selectively positionable to facilitate discharging a fluid flow from the gas turbine engine in a direction that is substantially parallel to a centerline of the turbine engine.

18. A gas turbine engine in accordance with claim 15 wherein said inner fairing comprises contours that facilitate varying said inner bypass flow area, and said outer fairing comprises contours that facilitate varying said outer bypass flow area.

19. A gas turbine engine in accordance with claim 14 wherein said augmentor valve assembly further comprises a crank assembly coupled to said annular valve to facilitate displacing said annular valve relative to said outer and said inner fairings.

20. A gas turbine engine in accordance with claim 19 wherein said augmentor valve assembly further comprises an actuator coupled to said crank assembly to facilitate positioning said annular valve relative to said outer and said inner fairings.

* * * * *